(12) United States Patent
Kemp et al.

(10) Patent No.: US 8,200,488 B2
(45) Date of Patent: Jun. 12, 2012

(54) METHOD FOR PROCESSING SPEECH USING ABSOLUTE LOUDNESS

(75) Inventors: Thomas Kemp, Esslingen (DE); Ralf Kompe, Fellbach (DE); Raquel Tato, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 2041 days.

(21) Appl. No.: 10/731,929

(22) Filed: Dec. 10, 2003

(65) Prior Publication Data
US 2004/0128127 A1 Jul. 1, 2004

(30) Foreign Application Priority Data
Dec. 13, 2002 (EP) .................................. 02 027 964

(51) Int. Cl.
*G10L 15/00* (2006.01)
(52) U.S. Cl. ........................................ 704/236; 704/246
(58) Field of Classification Search .................. 704/236, 704/246
See application file for complete search history.

(56) References Cited

U.S. PATENT DOCUMENTS

| | | | | |
|---|---|---|---|---|
| 4,817,149 | A * | 3/1989 | Myers ................................ | 381/1 |
| 4,918,730 | A * | 4/1990 | Schulze ........................ | 704/236 |
| 5,278,910 | A * | 1/1994 | Suzuki et al. .................. | 704/236 |
| 6,151,571 | A * | 11/2000 | Pertrushin ..................... | 704/209 |
| 6,353,810 | B1 * | 3/2002 | Petrushin ...................... | 704/236 |
| 6,539,350 | B1 * | 3/2003 | Walker ........................... | 704/233 |
| 6,593,956 | B1 * | 7/2003 | Potts et al. .................. | 348/14.09 |
| 6,686,839 | B2 * | 2/2004 | Chou et al. .................... | 340/540 |
| 6,823,304 | B2 * | 11/2004 | Ikeda ............................. | 704/231 |
| 7,035,798 | B2 * | 4/2006 | Kobayashi ..................... | 704/233 |
| 7,054,228 | B1 * | 5/2006 | Hickling ........................ | 367/124 |
| 7,180,892 | B1 * | 2/2007 | Tackin ........................... | 370/389 |
| 2002/0167862 | A1 * | 11/2002 | Tomasi et al. ................ | 367/118 |
| 2003/0182116 | A1 * | 9/2003 | Nunally ........................ | 704/236 |
| 2004/0158466 | A1 * | 8/2004 | Miranda ........................ | 704/236 |
| 2005/0027528 | A1 * | 2/2005 | Yantorno et al. ............. | 704/246 |
| 2005/0060153 | A1 * | 3/2005 | Gable et al. .................. | 704/246 |
| 2005/0086056 | A1 * | 4/2005 | Yoda et al. .................... | 704/246 |

OTHER PUBLICATIONS

Lee, C. M. et al., "Recognition of Negative Emotions from a Speech Signal," Dec. 9-13, 2001, ASRU '01 IEEE Workshop on Automatic Speech Recognition and Understanding, pp. 240-243.*

Brandstein, M. S. et al., Microphone Array Localization Error Estimation with Application to Sensor Placement, Jun. 1996 Journal of the Acoustical Society of America, 99(6):3807-3816.*

(Continued)

*Primary Examiner* — Douglas Godbold
(74) *Attorney, Agent, or Firm* — Oblon, Spivak, McClelland, Maier & Neustadt, L.L.P.

(57) ABSTRACT

The invention provides a method for processing speech comprising the steps of receiving a speech input (SI) of a speaker, generating speech parameters (SP) from said speech input (SI), determining parameters describing an absolute loudness (L) of said speech input (SI), and evaluating (EV) said speech input (SI) and/or said speech parameters (SP) using said parameters describing the absolute loudness (L). In particular, the step of evaluation (EV) comprises a step of emotion recognition and/or speaker identification. Further, a microphone array comprising a plurality of microphones is used for determining said parameters describing the absolute loudness. With a microphone array the distance of the speaker from the microphone array can be determined and the loudness can be normalized by the distance. Thus, the absolute loudness becomes independent from the distance of the speaker to the microphone, and absolute loudness can now be used as an input parameter for emotion recognition and/or speaker identification.

3 Claims, 2 Drawing Sheets

OTHER PUBLICATIONS

Quast H: "Automatic Recognition of Nonverbal Speech: An Approach to Model the Perception of Para-and Extralinguistic Vocal Communication with Neural Networks" 'Online! 2001, Thesis University of Göttingen XP002240575.

Ney H: "Measuring of the contours of intensity and fundamental period of speech for automatic speaker recognition" Freouenz, Oct. 1981, West Germany, vol. 35, No. 10, 1981, pp. 265-270, XP001149002.

Giuliani D et al: "Hands free continuous speech recognition in noisy environment using a four microphone array" Acoustics, Speech, and Signal Processing, 1995. ICASSP-95., 1995 International Conference on Detroit, MI, USA May 9-12, 1995, New York, NY, USA, IEEE, US, May 9, 1995, pp. 860-863, XP010151354.

Sullivan T M et al: "Multi-microphone correlation-based processing for robust speech recognition" Statistical Signal and Array Processing. Minneapolis, Apr. 27-30, 1993, Proceedings of the International Conference on Acoustics, Speech, and Signal Processing (ICASSP), New York, IEEE, US, vol. 4, Apr. 27, 1993, pp. 91-94, XP010110401.

* cited by examiner

METHOD FOR PROCESSING SPEECH USING ABSOLUTE LOUDNESS

BACKGROUND OF THE INVENTION

The invention relates to a method for processing speech, in particular to a method for emotion recognition and speaker identification.

In many systems with man-machine interfaces (MMI) it is desirable to integrate as much information as possible that can be derived from the various communication channels used by humans. In particular, it is often useful to include emotional information that describe the emotions of a user of a system, i.e. for example if the user is angry, happy, or sad. This emotional information may be derived from a speech signal of the user and can then be used e.g. to generate a respective response of the system. An example for a system, where emotional information can be useful, is an automatic teller machine (ATM) which is speech operated. If the user gets annoyed by the system, because the system has e.g. asked the user to repeat an order several times, he may get impatient. This emotional state may be detected by the system and thus the system's input mode may switch from speech to graphic/haptic input via a touch screen.

Another important point of today's MMI systems is the identification of speakers. In many systems it is important to know who is interacting with the system. For example, several people may share a car and certain parameters of the system may be set dependent on the current driver. It is therefore necessary that the driver be identified, which is commonly achieved by a speaker identification routine within the MMI system.

SUMMARY OF THE INVENTION

It is an object underlying the invention to provide a method for processing speech, in particular for emotion recognition and/or speaker identification.

To achieve this object, the invention provides a method according to claim 1. In addition, the invention provides a speech processing system, a computer program product, and a computer readable storage medium as defined in claims 9, 10, and 11, respectively. Further features and preferred embodiments are respectively defined in respective subclaims and/or in the following description.

According to the invention, a method for processing speech comprises the steps of receiving a speech input of a speaker, generating speech parameters from said speech input, determining parameters describing an absolute loudness of said speech input, and evaluating said speech input and/or said speech parameters using said parameters describing the absolute loudness.

This means, absolute loudness is used during evaluation of said speech input in addition to other parameters typically used in a classifier (e.g. a classifier for determining an emotional state of said speaker), such as prosodic features or voice quality features. Quality features of speech, i.e. auditory features arise from variation in the source signal and vocal tract properties, which are very speaker dependent.

Preferably, the step of evaluation comprises a step of emotion recognition and/or a step of speaker identification. The use of absolute loudness as a parameter for emotion recognition and speaker identification is a key feature of the invention. The rate of successful emotion recognition and the rate of successful speaker identification improved significantly using absolute loudness as an additional input parameter for the respective recognition systems.

Advantageously, a microphone array comprising a plurality of microphones, i.e. at least two microphones, is used for determining said parameters describing the absolute loudness. With a microphone array the distance of the speaker from the microphone array can be determined by standard algorithms and the loudness can be normalized by the distance.

This is done by estimating a time difference between microphones using correlation techniques.

Further, a location and/or distance of the speaker is determined and the absolute loudness is determined using standard algorithms for auditory and/or binaural processing. Thereby, an artificial head or similar shape with two microphones mounted at ear position is used. Processing in the ear is simulated, i.e. time delay and amplitude difference information between two "ears" is estimated and used to determine exactly the speakers position.

Said absolute loudness is preferably computed by normalizing the measured loudness at the microphones (signal gain) or the energy by said distance. Preferably this is done by multiplication, i.e. Distance times Energy.

Said distance is thereby determined using standard algorithms for speaker localization. The normalization by the distance is a key feature of the invention, because the normalization transforms the measured loudness into the absolute loudness. By normalizing the loudness by the distance the determined absolute loudness becomes independent of the distance of the speaker from the microphone.

In prior art emotion recognition systems and speaker identification systems loudness could not be used because a speaker speaking with the same loudness appeared to speak with a different loudness depending on his distance to the microphone.

A speech processing system according to the invention is capable of performing or realizing the inventive method for recognizing speech and/or the steps thereof.

A computer program product according to the invention, comprises computer program means adapted to perform and/or to realize the inventive method of recognizing speech and/or the steps thereof, when it is executed on a computer, a digital signal processing means, and/or the like.

A computer readable storage medium according to the invention comprises the inventive computer program product.

The invention and advantageous details thereof will be explained by way of an exemplary embodiment thereof in the following with reference to the accompanying drawings, in which

DESCRIPTION OF THE PREFERRED EMBODIMENT

Figure 1:
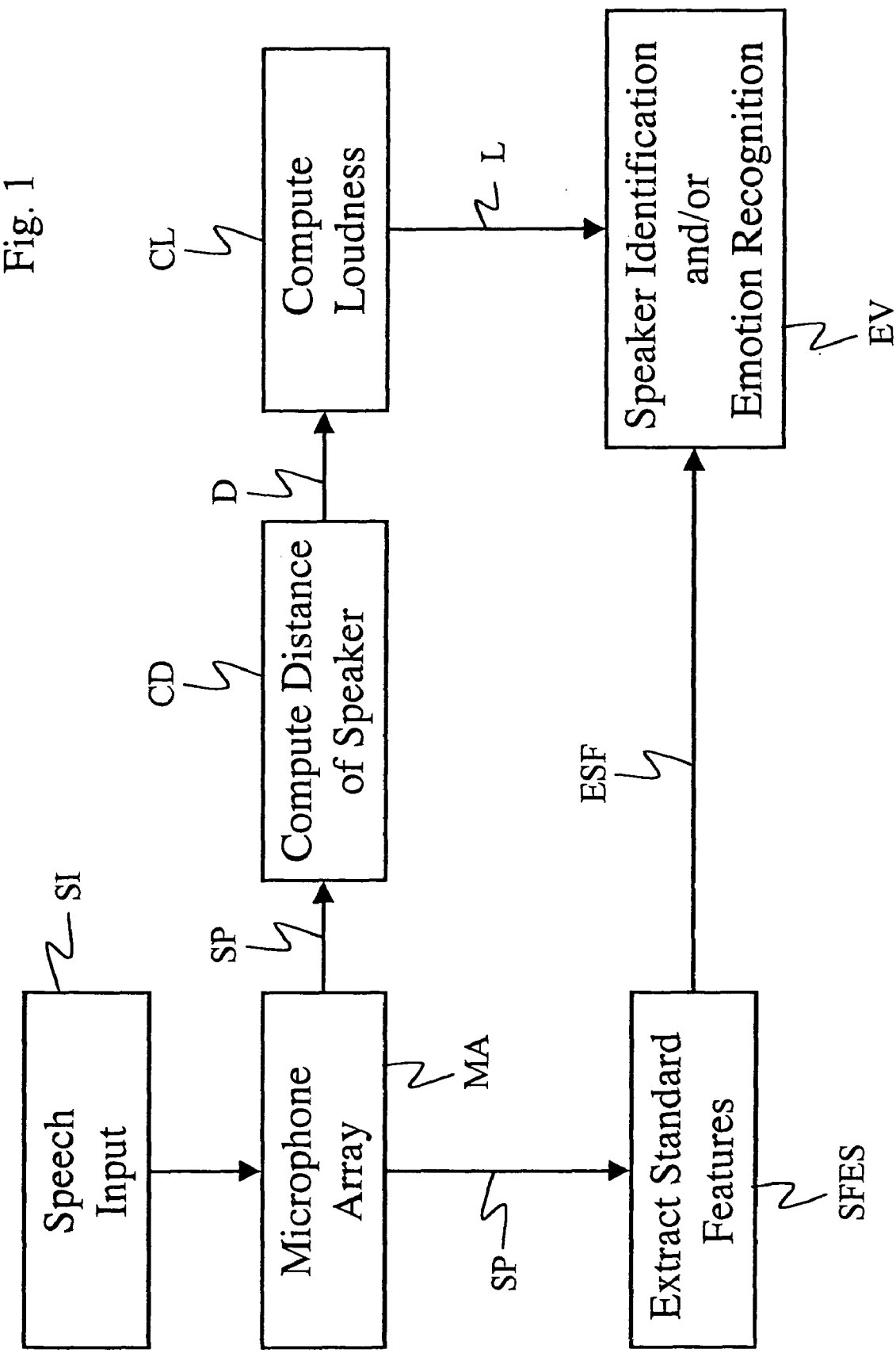
FIG. 1 shows a flowchart illustrating the inventive steps.

In FIG. 1 the speech input SI of a speaker S, in the following also referred to as user of the system, is received by a microphone array MA. Then, speech parameters SP are derived from the received speech input SI. The speech parameters can be any kind of acoustic features, derived from the spectrum and/or time series, e.g. voice quality features, prosodic features, In a distance computing step CD the distance D of the speaker S from the microphone array MA is determined, i.e.

the speaker is localized. Thereby, the time difference TD (also referred to as time delay) between microphones is estimated, using correlation techniques.

The distance D is further used in a loudness computing step CL, wherein the absolute loudness L is determined, which is measured in units of dbA. The absolute loudness L is determined using the signal energy, i.e. the absolute loudness is the energy normalized by the distance D.

Thereby, signal energy is measured in a window, e.g. by $$E = \sqrt{\sum_{n=1}^{N} S_n^2},$$

where $s_n$ is the digistized speech signal. Many alternative formulars exist. In a similar way the signal energy E can be computed from the spectrum. In that case frequency based weighting according to ear sensitivity in different frequency bands can be applied. Since energy decreases proportional to 1/D, with D being the distance D between the speaker and the microphone (see FIG. 2), absolute energy or loudness can be computed as D*E, i.e. by multiplying the distance D and the Energy E.

The absolute loudness L is now used in an evaluation step EV. This evaluation step EV may comprise a speaker identification and/or emotion recognition.

Besides the absolute loudness L, standard features ESF are used in the evaluation step EV. These standard features ESF are extracted in parallel to the distance computing step CD, and the loudness computing step CL in a standard feature extracting step SFES. In this standard feature extracting step SFES the received speech parameters SP from the microphone array MA are processed.

Figure 2:
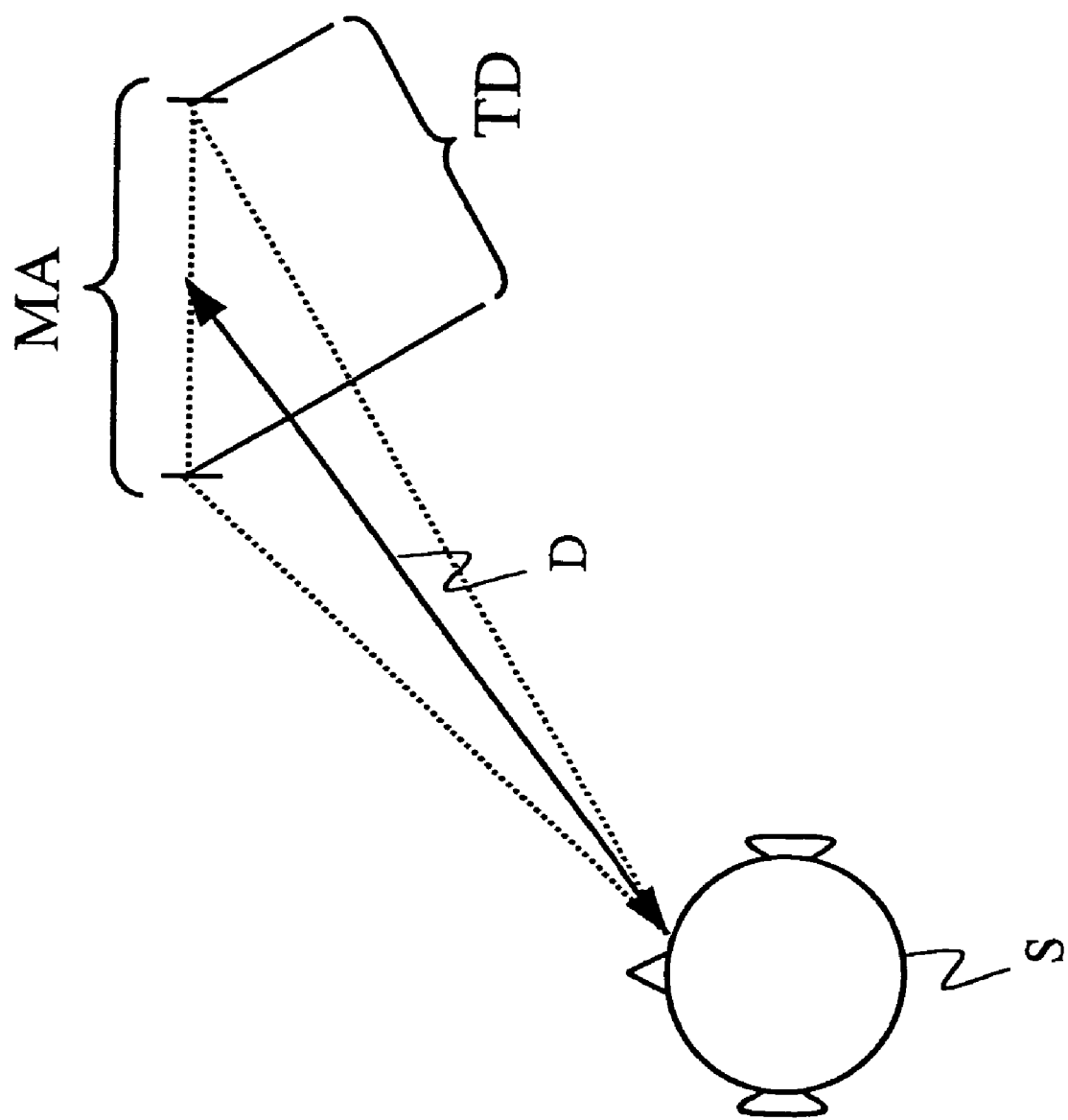
FIG. 2 shows an example of a localized speaker according to the invention.

In FIG. 2 a speaker S is shown. The speaker has a certain distance D from the microphone array MA. As mentioned above, the distance D is determined in the distance computing step CD of FIG. 1 and is used for determining the absolute loudness L. Thereby, the time difference of the signals arriving at the different microphones of the microphone array is determined using correlation techniques.

It should be noted that loudness could not be used in prior art systems for emotion recognition and/or speaker identification because in prior art systems only one microphone is used. If only one microphone is used, the loudness depends on the distance of the speaker to the microphone. Moreover, in prior art systems, the speech signal is normalized to eliminate any "disturbing" variance of loudness. This fact further prevents the use of loudness for emotion recognition and/or speaker identification.

With the invention, the absolute loudness can now be determined and be used for emotion recognition and/or speaker identification. In this context it is assumed that absolute loudness can be important for emotion recognition and also is characteristic for speakers and thus carries valuable information for speaker identification.

REFERENCE SYMBOLS

CD distance computing step
CL loudness computing step
D distance
ESF extracted standard features
EV evaluation step
L absolute loudness
MA microphone array
S speaker
SFES standard feature extracting step
SI speech input
SP speech parameters
TD time difference

The invention claimed is:

1. A method for processing speech, comprising:
   receiving a speech signal of a speaker;
   generating speech parameters from said speech signal;
   determining a distance of the speaker based on a time delay of a respective arrival of said speech signal at two or more microphones;
   normalizing a measured loudness or energy by said distance;
   calculating an absolute loudness being a loudness of a speech that generated the speech signal at a location of a source of the speech; and
   evaluating at least one of said speech signal and said speech parameters using the normalized loudness or energy to identify the speaker.

2. A system for emotion recognition and/or speaker identification, comprising:
   at least two microphones configured to receive a speech signal;
   a data processor configured to generate speech parameters from said speech signal, to determine a distance of the speaker based on a time delay of a respective arrival of said speech signal at said microphone, to normalize a measured loudness or energy by said distance, to calculate an absolute loudness being a loudness of a speech that generated the speech signal at a location of a source of the speech; and
   further configured to evaluate at least one of said speech signal and said speech parameters using the normalized loudness or energy to identify the speaker.

3. A method for processing speech comprising the steps of:
   receiving a speech signal of a speaker;
   calculating an absolute loudness being a loudness of a speech that is generated by the speaker at a location of a source of the speech;
   determining features from the speech signal, wherein the features are at least partly based on the absolute loudness; and
   determining an identity of the speaker based on the features.

* * * * *